ary Examiner.

United States Patent
Wada et al.

[15] 3,698,358
[45] Oct. 17, 1972

[54] METHOD FOR MAINTAINING FRESHNESS OF AQUATIC ANIMALS

[72] Inventors: Takeo Wada; Kazuo Okada; Masaru Ohyama, all of Osaka, Japan

[73] Assignee: Takeda Chemical Industries, Ltd., Osaka, Japan

[22] Filed: Feb. 3, 1971

[21] Appl. No.: 112,409

[30] Foreign Application Priority Data

Feb. 13, 1970  Japan ...................45/12703
March 3, 1970  Japan ...................45/18104

[52] U.S. Cl.........................................119/2, 99/195
[51] Int. Cl. .............................................A01k 61/00
[58] Field of Search.......................119/1–5; 99/195

[56] References Cited

UNITED STATES PATENTS 2,266,664  12/1941  Stevens..........................119/2
2,328,993  9/1943  Norling..........................119/2
2,563,364  8/1951  Proctor..........................119/2
1,016,627  2/1912  Higgins..........................119/2
2,848,976  8/1958  Combs..........................119/1
3,425,397  2/1969  Schulein........................119/1

Primary Examiner—Aldrich F. Medbery
Attorney—Wenderoth, Lind & Ponack

[57] ABSTRACT

A method and compositions for maintaining the freshness or viability of live, hard-skinned crustaceous type aquatic animals wherein in said method said animals are embedded in a granular filler composition comprising expanded vermiculite particles. The expanded vermiculite can advantageously be prepared from a dry composition comprising unexpanded vermiculite particles and a hydrogen peroxide addition compound by the addition of water thereto but expanded vermiculite made in other ways is also useful for the purpose.

10 Claims, No Drawings

METHOD FOR MAINTAINING FRESHNESS OF AQUATIC ANIMALS

This invention relates to a method and habitat compositions for maintaining the freshness of live, hard-skinned aquatic animals in air.

It is an important but difficult problem for food industries as well as for dealers in aquatic animals to maintain the freshness, viability or liveliness of wet aquatic animals during their transportation or storage in air; that is, from the time of being pulled out of the environmental water to the time of being put into use as food or bait or being released again into water for further cultivation. Especially for certain expensive varieties of hard-skinned aquatic animals such as prawns, lobsters or blue crabs, their freshness or liveliness is of value and has much influence upon the purchase price. Also in the procurement of aquatic animals for pets or for breeding purposes, it is essential to keep the animals alive for a relatively long time.

For such purposes, various measures have hitherto been developed and practiced; for example, keeping such live animals in containers filled with water or sawdust, and the combination of such a technique with the use of aircraft in order to reduce the time required for the transit. It is, however, well known that those methods are not altogether free from drawbacks and afford only unsatisfactory results in view of their complicated shipping procedures or still high mortality or expensive freight rates.

The present invention provides a means for maintaining a habitat for the viability or freshness, not in water but in air, of those aquatic animals which to have hard skins in the form of a crust or shell, and which include crustacea, shellfish and nereides.

It has been found by the present inventors that those hard-skinned animals can survive in a suitable layer of some expanded vermiculite particles without any substantial injury of the animals. It was still more surprising to find that the expanded vermiculite particles as the filler for a package can afford a far higher survival rate of the packed animals than the conventional sawdust or the like does.

Vermiculite is a generic designation of hydrated laminar aluminosilicate minerals which have the property of expanding when rapidly heated at temperatures beyond a certain critical level, and includes phillosilicates which closely resemble mica, minerals formed on hydrothermal alteration of periodotite, second-order minerals which are obtained on disintegration of micas, minerals which are recoverable from serpentine, and hydrolyzed micas which are the products of hydrolytic alteration of biotite.

In accordance with this invention, the vermiculite is employed in an expanded form, i.e., as expanded vermiculite. As is well known, the vermiculite tends to expand in one direction upon rapid heating, and its volume may be increased about 5 to 20 times, or even about 30 times in some materials. In the practice of this invention, it is advantageous to employ one which has been expanded at least 5 times, desirably 10 times or more.

Expansion of vermiculite can be effected, for example, by rapidly heating the vermiculite at a temperature of about 800°C or higher (The expanded product thus obtained will hereinafter be called "vermiculite E"), or by the steps of spraying the raw vermiculite evenly with an aqueous solution of hydrogen peroxide, and then heating the same at a temperature of about 60° to 100°C for approximately 20 minutes or so. (The expanded product thus obtained will hereinafter be called "vermiculite EP"). Expanded vermiculites produced by any other procedures may be employed for the present invention so far as they do not contain any hazardous additives to the live, aquatic animals to be treated.

It is advisable to employ vermiculite in an average size of from about 1 to 8 millimeters, more desirably about 1 to 5 millimeters, in at least two dimensional directions.

The thus-expanded vermiculites are usually free from putrescent organic matters which were originally present in the raw material, and, as such, afford excellent results, thanks to their improved porosity and other beneficial properties. In the practice of this invention, the use of vermiculite EP(i.e. vermiculite expanded in the presence of hydrogen peroxide) is conducive to a still lower mortality of the animals. However, even with the other expanded vermiculites far better results are obtained than by the use of sawdust.

The live or wet, hard-skinned aquatic animals, to which this invention is applicable, include such crustacea as prawns, lobsters, shrimps, crabs, squills or the like; such shellfishes as clams, corbicula, pond snail, ivory shell, ark shell, trough-shell or the like; and such annelids as nereides which are used as live bait by fishermen.

The animals are embedded, while alive, in a layer of a granular filler comprising the expanded vermiculite particles as soon as they are pulled out of the environmental water, whether sea-water, fresh water or therebetween as the case may be. The filler may be wet with water or the environmental water, but too much water is not only unnecessary but disadvantageous in requiring particular casing, and even dry expanded vermiculite will afford a highly improved result for maintaining the freshness of the animals. It is recommended, if circumstances permit, to embed the respective animals separately from one another in the layer of filler; in other words, to put one animal so as not to be brought into direct contact with the other animal.

In such an embedded state, the animals can survive far longer than in a conventional filler layer, thus freshness of the animal can be retained longer. Furthermore, it is noteworthy that the method of the present invention affords an improved result even when the aquatic animals in the embedded state are frozen as they are, compared with the case where no filler or other conventional filler is employed. One reason therefor may reasonably be understood as due to the effect in retaining freshness or liveliness of the animals until they are frozen. But the freezing will naturally kill the animals at least in some cases. Nevertheless, even on such occasions a highly improved result is obtained with the use of the filler comprising expanded vermiculite particles according to the method of the present invention. This unexpected beneficial result is possibly due to some extent to the heat-insulating property of the expanded vermiculite.

As to this property, there are other interesting observations. For cold preservation purposes in the summer and for anti-freezing purposes in the winter, polystyrene foams have heretofore been routinely employed. It has been observed by the present inventors that the expanded vermiculite yields superior heat-insulating results to those of the polystyrene foams. It has thus become possible not to use, or to minimize the use of, the polystyrene foams, and even attain the desired result to complete satisfaction with corrugated paper packing materials.

With reference to transportation of the hard-skinned aquatic animals it is conventional to use corrugated paper board boxes filled with dry refined sawdust. Now if this sawdust bed is replaced with the same volume of the dry expanded vermiculite filler of this invention and the same population of the animals are embedded in this filler, the boxes, after being covered, are ready to be shipped by vehicles such as trucks, ships or aircraft in the routine manner.

The aforesaid different types of expanded vermiculites may be used as various mixtures, depending on the specific purpose, species of animals, any other accompanying treatment and other factors. Of course, it is also possible to obtain the desired result by the use of the expanded vermiculites in admixture with sawdust and/or other known fillers. The advantageous effect of the expanded vermiculite will be eminently observed when the granular filler comprises at least 8 percent, more preferably 20 percent or higher, by weight of the expanded vermiculite.

Also depending upon said various factors, it is convenient to prepare, prior to the practice of the present invention, a vermiculite composition comprising unexpanded vermiculite particles and a hydrogen peroxide addition compound. It has also found by the present inventors that the composition has such a low bulk that it can be easily transported and that such a composition can be caused to expand in situ by a mere addition of water at a moderate temperature, e.g. from ambient temperature to 100°C. As for the hydrogen peroxide addition compound for this purpose, the advantageous ones are, for example, urea-hydrogen peroxide adduct, alkali metal pyrophosphate-hydrogen peroxide adducts, alkali metal tripolyphosphate-hydrogen peroxide adducts, alkali metal orthophosphate-hydrogen peroxide adducts, alkali metal carbonate-hydrogen peroxide adducts, alkali metal borate-hydrogen peroxide adducts, alkali metal sulfate-hydrogen peroxide adducts or the like, said alkali metal or metals being sodium and/or potassium. These salts may of course be used in form of acid salts or as a mixture of more than one of them, in order to yield a desired pH in the resulting expanded vermiculite. Said premix composition can easily be prepared by admixing any of said hydrogen peroxide adducts with the unexpanded vermiculite in a proper mixing proportion according to per se conventional blending means. The proper mixing proportion varies depending upon the type of the adduct, intended use of the resulting expanded vermiculite or other factors, but it is usually advantageous to employ the hydrogen peroxide adduct in an amount of, as $H_2O_2$ from, about 50 grams to about 1 kilogram, but for better results about 100 grams to about 500 grams, per kilogram of the unexpanded vermiculite. Thus prepared premix is very handy for transportation or storage because of its high stability and compact nature, and it can readily expand with the addition of water or hot water at the place where the expanded vermiculite is needed. By way of example, some preferable premix compositions are shown as follows:

1. 10 grams of unexpanded vermiculite in an average size of 2 millimeters square and 4 grams of $Na_2HPO_4 \cdot H_2O_2$ are evenly admixed. This admixture remains unchanged upon being allowed to stand at 25°C for 1 month. Upon the addition of 60cc. of hot water of 90°C to the composition it begins to expand and after about 20 minutes while kept warm, its bulk reaches about 220 cc.

2. 10 grams of unexpanded vermiculite of an average size of 1 mm. square and 7 grams of $Na_4P_2O_7 \cdot 2H_2O_2$ are evenly admixed. This composition also remains unchanged on standing at 25°C for 1 month. The addition of 70 cc. of hot water of 90°C to the composition results in expansion up to 120 cc bulk in 30 minutes.

3. Urea is saturated in 10 cc. of a 35 percent aqueous hydrogen peroxide solution at 25°C, and the solution is rapidly cooled to 5°C, whereupon crystals of $H_2N-CO-NH_2 \cdot H_2O_2$ separate. The crystals are collected by filtration. 5 grams of the crystals are evenly admixed with 10 grams of unexpanded vermiculite of an average size of 2 mm. square. The admixture remains unchanged on standing at 25°C for 1 month. The addition of 20 cc. of cold water and heating the resultant mixture on a water bath for 10 minutes result in expansion up to 160 cc. bulk.

The method of the present invention is further explained by way of example. In the following examples as well as the foregoing description, the abbreviations "g.," "kg.," "mm.," "cm." and "cc." mean "gram(s)," "kilogram(s), "millimeter(s)," "centimeter(s)" and "cubic centimeter(s)," respectively.

EXAMPLE 1

A sheet of paper was spread on the bottom of each of corrugated paper boxes of the size of 42 × 30 cm. and 20 cm. in height. 25 lively prawns, each weighing about 12 g., were embedded in each of the boxes, using as filler a sample of dry, routinely refined sawdust (for control) or the sample of either vermiculite E or vermiculite EP, so that the prawns may be spread in the layer of filler in each box. The boxes were then covered and sealed with a tape, and kept undisturbed at 12°C for 72 hours. The prawns were examined and their survival rate was calculated for each sample of the fillers. The result shows that, while the survival rate of the prawns in the sawdust was 20 percent, those in vermiculite E and vermiculite EP were 60 percent and 80 percent, respectively.

EXAMPLE 2

In the same manner as in Example 1, 26 lively prawns were embedded in an evenly mixed filler bed of 50 percent by weight of vermiculite EP and 50 percent by weight of sawdust in corrugated paper board boxes. The boxes were kept undisturbed at 12°C for 72 hours, giving 69 percent of the survival rate of the prawns.

EXAMPLE 3

In a similar manner to that in Example 1, 8 lively prawns, each weighing about 12 g., were embedded in each of the filler samples listed in Table 1, and the boxes were kept undisturbed at 18°C. The prawns were examined after 24 hours and 48 hours, respectively, rendering the respective survival rates as shown in Table 1.

TABLE 1

| Blending ratio in fillers by weight (%) | Vermiculite EP | 100 | 50 | 25 | 0 |
|---|---|---|---|---|---|
| | Sawdust | 0 | 50 | 75 | 100 |
| Survival rate (%) | After 24 hours | 100 | 100 | 100 | 100 |
| | After 48 hours | 100 | 62.5 | 25 | 0 |

EXAMPLE 4

In each of three wooden boxes of 5 × 5 × 5 cm., 25 lively nereides were embedded, using as filler a) seashore sand, b) vermiculite E or c) vermiculite EP, each sample being wet with sea water. The boxes were kept undisturbed at 15°C. The nereides in the boxes were examined after 2, 3, 4 and 6 days, respectively, giving the survival rates as shown in Table 2.

TABLE 2

| Filler Days | Seashore sand | Vermiculite E | Vermiculite EP |
|---|---|---|---|
| 2 days | 42% | 83% | 95% |
| 3 days | 20% | 70% | 94% |
| 4 days | 6% | 21% | 93% |
| 6 days | 0% | 0% | 62% |

EXAMPLE 5

In a similar manner to that in Example 1, 20 heads per box of lively prawns, each weighing about 18 to 20 g., were embedded with a) sawdust, b) vermiculite EP or c) a filler consisting of 20 percent by volume (8 percent by weight) of vermiculite EP and sawdust. For each of the fillers a), b) and c), five boxes were prepared, and the boxes were kept at 10°C. The time to reach 80 or 50 percent of the survival rate was observed. Results are shown in Table 3.

TABLE 3

| Filler | a) | b) | c) |
|---|---|---|---|
| Time in hours to reach 80% survival rate | 34 | 79 | 54 |
| Time in hours to reach 50% survival rate ($LT_{50}$) | 42 | 102 | 70 |

Having thus disclosed the invention, what is claimed is:

1. Method for maintaining the viability of a live or wet, hard-skinned aquatic animal in an air, habitat which comprises pulling up the aquatic animal alive from the environmental water, and embedding the live animal in a layer of a granular filler comprising expanded vermiculite particles.

2. The method according to claim 1, wherein the vermiculite particles are of an average size of about 1 to 8 millimeters in at least two dimensional directions.

3. The method according to claim 1, wherein the filler comprises at least 8 percent by weight of the expanded vermiculite particles.

4. The method according to claim 1, wherein the vermiculite is one expanded in the presence of hydrogen peroxide.

5. The method according to claim 1, wherein the aquatic animal is a crustacean.

6. The method according to claim 1, wherein the aquatic animal is a shellfish.

7. The method according to claim 1, wherein the aquatic animal is a nereid.

8. A habitat for embedding crustaceous type marine life which comprises a container substantially filled with containing a granular filler which comprises expanded vermiculite particles.

9. A habitat as in claim 8 wherein the filler material comprises sawdust and expanded vermiculite particles, the said vermiculite particles being present in an amount of at least 8 percent by weight of the filler material.

10. A habitat as in claim 9 wherein the vermiculite particles are present in an amount of at least 20 percent by weight of the filler material.

* * * * *